United States Patent

[11] 3,624,010

[72] Inventor Norman G. Holdstock
    Scotia, N.Y.
[21] Appl. No. 10,063
[22] Filed Feb. 12, 1970
[45] Patented Nov. 30, 1971
[73] Assignee General Electric Company
    Continuation of application Ser. No.
    598,193, Dec. 1, 1966, now abandoned.
    This application Feb. 12, 1970, Ser. No.
    10,063

[54] SILICONE FOAMS
    7 Claims, No Drawings
[52] U.S. Cl. .................................. 260/2.5,
    260/46.5, 260/448.2
[51] Int. Cl. ................................. C08f 47/10,
    C08j 1/22
[50] Field of Search ......................... 260/2.5,
    46.54

[56] References Cited
    UNITED STATES PATENTS
    3,015,646  1/1962  Speier .................. 260/46.54
    3,047,528  7/1962  Blustein ............... 260/46.54
    FOREIGN PATENTS
    887,905  1/1962  Great Britain .......... 260/2.5
    OTHER REFERENCES
    J. H. Saunders & K. C. Frisch, Polyurethanes Part I, High Polymers Monograph Series, N.Y., INTERSCIENCE, 1962, Vol. XVI, Pgs. 79–81

Primary Examiner—Murray Tillman
Assistant Examiner—Morton Foelak
Attorneys—Robert S. Friedman, William A. Teoli, Frank L. Neuhauser, Oscar B. Waddell and Melvin M. Goldenberg ABSTRACT: An organopolysiloxane foam is made by mixing a carboxyalkylpolysiloxane, a diisocyanate and a tertiary amine; allowing the composition to foam, then curing the foamed composition. The foamed product makes an excellent thermal barrier, electrical insulator and shock absorbing mounting for electronic circuits.

SILICONE FOAMS

This application is a continuation of application Ser. No. 598,193, filed Dec. 1, 1966 now abandoned.

This invention relates to silicone foams, to their preparation, and to compositions from which they are prepared.

Silicone foams have been known in the art and have generally comprised conventional silicone compositions containing a conventional rubber blowing agent, such as alpha, alpha'-azo-diisobutyronitrile, which decomposes into nitrogen and other products when heated. While this method of preparing silicone foams has worked satisfactorily for foams prepared in closed molds, this system has not been satisfactory for free-blown silicone foams. One composition which has been used for free-blown silicone foams has been a composition containing silicon-bonded hydrogen groups which, in the presence of water and a suitable catalyst, has decomposed into hydrogen which has served as a blowing agent. However, hydrogen evolution has been a problem because of the safety problems associated with hydrogen.

The present invention is based on my discovery of a new silicone foam system which is capable of forming both free-blown foams and molded foams and which, in addition, does not liberate any products which cause a safety problem. In particular, the foams of the present invention involve the generation of carbon dioxide as the foaming agent.

The foams of the present invention are prepared by forming a mixture of carboxyalkylpolysiloxane, a diisocyanate, and a tertiary amine catalyst. More particularly, the compositions employed to produce the foam comprise (A) a carboxyalkylpolysiloxane having the formula:

(1) 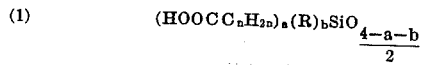

(B) a diisocyanate having the formula:

(2) $$O=C=NR'N=C=O$$

and (C) a tertiary amine, where R is a monovalent hydrocarbon radical; R' is a divalent hydrocarbon radical free of aliphatic unsaturation and containing at least three carbon atoms; $a$ has a value of from 0.01 to 0.5, inclusive; $b$ has a value of from 1.48 to 2.00, inclusive; the sum of $a$ plus $b$ is from 1.98 to 2.01, inclusive; and $n$ has a value of from 2 to 4, inclusive.

As will be described in more detail hereinafter, the foams with which the present invention is concerned are prepared by thoroughly mixing the carboxyalkylpolysiloxane of formula (1), the diisocyanate of formula (2), and the tertiary amine, allowing the resulting mixture to foam and subsequently curing the foam. The foaming takes place spontaneously at room temperature, but can be accelerated by raising the temperature slightly. The curing also can take place at room temperature but again can be accelerated by the use of higher temperatures.

The carboxyalkylpolysiloxanes employed in the practice of my invention are materials well known in the art and are generally liquid materials having viscosities in the range of from about 50 to 100,000 centistokes. As is apparent from formula (1), these compositions are primarily difunctional, i.e., they contain close to about two silicon-bonded R groups and carboxyalkyl radicals per silicon atom. However, the formula shows that the compositions also can contain slightly fewer than two groups per silicon atom or slightly more than two of such groups per silicon atom.

The monovalent hydrocarbon radicals represented by R in the carboxyalkylpolysiloxane of formula (1) can vary within known wide limits. Illustrative of such monovalent hydrocarbon radicals are, for example, alkyl radicals, e.g., methyl, ethyl, propyl, butyl, octyl, octadecyl, etc. radicals; aryl radicals, e.g., phenyl, naphthyl, tolyl, xylyl, etc. radicals; aralkyl radicals, e.g., phenylethyl, benzyl, etc. radicals; and alkenyl radicals, e.g., vinyl, allyl, etc. radicals; cycloaliphatic radicals, e.g., cyclohexyl, cycloheptyl, cyclohexenyl, etc. radicals. While the R radical has been described as a monovalent hydrocarbon radical, this term includes substituted monovalent hydrocarbon radicals where the substituent is generally inert to the reactants under the conditions of the reaction. Such substituents include halogens, nitrile groups, nitro groups, and the like. Illustrative of such substituted monovalent hydrocarbon radicals are, for example, chloroethyl, trifluoromethylethyl, chlorophenyl, dibromophenyl, beta-cyanoethyl, gamma-cyanopropyl, p-cyanophenyl, p-nitrophenyl, etc. radicals.

The carboxyalkylpolysiloxanes within the scope of formula (1) are preferably triorganosilyl chain-stopped polydiorganosiloxanes in which the various siloxane units can include $(R)_2SiO$, $(R)_3SiO_{0.5}$, $(HOOCC_nH_{2n})(R)_2SiO_{0.5}$ and $(HOOCC_nH_{2n})(R)SiO$. These various units are selected in the proportions to provide the carboxyalkylpolysiloxane within the scope of formula (1) which is desired. In addition to the difunctional organosiloxanes and triorganosiloxane chain-stopping units, the polymeric materials of the present invention can also include trifunctional siloxane units having the formula $(HOOCC_nH_{2n})SiO_{1.5}$ and $RSiO_{1.5}$. The proportions of the monoorganosiloxane units, diorganosiloxane units, and triorganosiloxane units are again selected so as to fall within the scope of formula (1). It is, of course, possible to include some $SiO_2$ units in the polysiloxane carboxyalkylpolysiloxane composition, but no particular advantage is gained thereby.

In the preferred embodiment of my invention, the carboxyalkylpolysiloxane of formula (1) is a triorganosilyl chain-stopped polydiorganosiloxane and contains at least three silicon-bonded carboxyalkyl radicals per silicon atom. In the preferred embodiment of my invention, the carboxyalkyl radical is a beta-carboxyethyl radical, but it should be understood that the carboxyalkyl radical can also be carboxypropyl or carboxybutyl. Preferably, the carboxy group is attached to a carbon atom other than a carbon atom attached to silicon of the carboxyalkylpolysiloxane.

It has previously been mentioned that the subscript $a$ of formula (1) can vary from about 0.01 to 0.5. This means that the carboxyalkylpolysiloxane can contain from one carboxyalkyl radical per 100 silicon atoms up to one carboxyalkyl radical per two silicon atoms. The difference in the composition obtained at one end of this range from the composition obtained at the other end of the range becomes apparent from examination of products within the scope of the present invention from materials of these two ranges. For example, with compositions in which the value of $a$ is approximately 0.01, the foamed products of the present invention are elastic silicone rubber materials. On the other hand, with compositions in which $a$ is near 0.5, the products of the present invention are rigid silicone foams of little flex.

These characteristics of the compositions of the present invention are believed to be the result of a mechanism which involves the reaction shown below, in which the diisocyanate of formula (2) reacts with two silicon-bonded carboxyalkyl radicals under the influence of the amine catalyst to produce an intermediate product which decomposes into a diamide with the release of carbon dioxide.

(5)

$$\equiv SiC_nH_{2n}COOH + O=C=NR'N=C=O + HOOCC_nH_{2n}Si\equiv \xrightarrow{\text{Amine Cat.}}$$

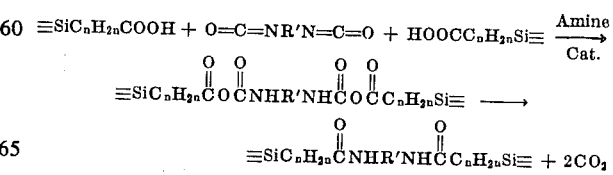

The formation of the diamide serves to cross-link the organopolysiloxane compositions and, since this cross-linking occurs only through carboxyalkyl groups, the degree of cross-linking is a function of the number of carboxyalkyl groups in the carboxyalkylpolysiloxane. At the lower values of $a$ of formula (1), the reactive sites are of the general order desirable to form flexible silicone rubber materials, while at the upper end of the range of $a$, the reactive sites are sufficiently great to provide a high degree of cross-linking. The carbon dioxide generated during the reaction causes foaming of the product during the curing reaction and, thus, causes foam formation.

This description of the proposed mechanism of the foam formation of the present invention also illustrates the ratio of components desirable in the reaction mixture. One molecule of the diisocyanate of formula (2) reacts with two carboxyalkyl groups to ultimately form the amide linkage and this is the ratio in which the components are employed in the practice of my invention, since there is no need to provide an excess of either silicon-bonded carboxyalkyl groups or isocyanate radicals in the final product. While the general ratio is the stoichiometric ratio of one isocyanate group per carboxyalkyl group, it is apparent that no particular harm is found in employing a slight excess, e.g., a 10 percent excess, of either component. However, where an excess is employed, it is preferred that the carboxyalkylpolysiloxane be the component present in the excess amounts.

The diisocyanates which are useful in the practice of the present invention are well known in the art. These diisocyanates contain two isocyanate groups per molecule which are separated from each other by at least three carbon atoms. These diisocyanates can be aromatic or aliphatic and their nature is illustrated by the radical R', which consists preferably of carbon and hydrogen atoms only, but which may also include oxygen atoms. Preferably, also, the radical r' is a mononuclear aromatic radical. Illustrative of the various diisocyanates which can be employed in the practice of the present invention are 2,4-toluene diisocyanate; m-phenylene diisocyanate; methylene-bis-(4-phenylisocyanate); 4-methoxy-m-phenylene diisocyanate; 1,6-hexamethylene diisocyanate; 2,6-toluene diisocyanate; 3,3'-bitolylene-4,4'-diisocyanate; diphenylmethane-4,4'-diisocyanate; 3,3'-dimethyldiphenylmethane-4,4'-diisocyanate; dianisidine diisocyanate; etc. In addition to using only a single isocyanate in the production of the foams of the present invention, it is also contemplated that mixtures of several diisocyanates can be employed. In fact, the preferred diisocyanate employed in the practice of the present invention is the commercial toluene diisocyanate mixture which consists of 80 percent by weight of 2,4-toluene diisocyanate and 20 percent by weight of 2,6-toluene diisocyanate.

The tertiary amine catalysts employed in the practice of the present invention are generally hydrocarbon amines containing only carbon, hydrogen and nitrogen. Suitable amines include trialkylamines, such as triethylamine, tributylamine, dimethylethylamine, dimethylcyclohexylamine; triarylamines, such as triphenylamine, tritolylamine, trinaphthylamine; alkaryl amines, e.g. dimethylphenylamine, benzyldimethylamine, butyldiphenylamine, etc.; heterocyclic amines, e.g., pyridine, quinoline; N-substituted piperidine, such as N-methylpiperidine; diamines, e.g., N,N,N',N'-tetramethylethylenediamine, N,N,N',N'-tetramethylbutanediamine, tetramethylguanidine, etc. In addition, tertiary amines employed in the present invention include amines containing atoms other than carbon, hydrogen and nitrogen, where the other atoms do not affect the characteristics of the amine. An example of this type of amine is N-ethylmorpholine, where the heterocyclic atom is oxygen.

The tertiary amine is a true catalyst in the present invention and, therefore, need be present only in catalytic amounts. Experience has shown that satisfactory silicone foams can be produced employing amounts of amine catalyst in the range of from about 0.1 to 1 percent by weight, based on the weight of the reaction mixture. Suitable results can be obtained employing amounts lower than 0.1 percent, such as 0.05 percent, and using amounts of the amine greater than 1 percent, for example, up to about 5 percent. However, no particular advantage is observed in using less than 0.1 percent by weight, or more than 1 percent by weight.

To prepare the foams of the present invention, the carboxyalkylpolysiloxane of formula (1), the diisocyanate of formula (2) and the tertiary amine catalyst are simply mixed in conventional fashion. Since the reaction between the carboxyalkylpolysiloxane and the diisocyanate is a rapid reaction, it is desirable to mix the components as rapidly as possible. Once the components are mixed, the reaction between the carboxyalkylpolysiloxane and the isocyanate begins and the evolution of carbon dioxide bubbles begins. The bubbles cause the material to foam and the cross-linking reaction between the silicone and the isocyanate causes the reaction mixture to cure at least in part and, after about 30 minutes, the foaming reaction is completed. Subsequently, the foamed material is cured. The foaming reaction takes place satisfactorily at room temperature, although elevated temperatures can be employed even though no particular advantage is derived thereby. Likewise, the final cure of the foamed product can also take place at room temperature. However, for complete cure at room temperature, several days are required. On the other hand, heating in a circulating air oven at a temperature of from about 100° to 120° C. results in a cured product almost as soon as the product has reached the curing temperature.

The characteristics of the foam are, as mentioned before, a function of the percentage of silicon atoms which contain a silicon-bonded carboxyalkyl radical. With low percentages, the product is elastic. With higher percentages, the product is a rigid foam. In any case, the volume of the foam is increased by a factor of about 3–10 by the foaming reaction.

The following examples are illustrative of the practice of my invention and are not intended for purposes of limitation. All parts are by weight.

EXAMPLE 1

The carboxyalkylpolysiloxane employed in this invention was a linear trimethylsilyl chain-stopped copolymer of dimethylsiloxane units and methyl-beta-carboxyethylsiloxane units containing an average of about 25 silicon atoms per molecule, with 10 percent of the silicon atoms being methyl-beta-carboxyethylsiloxane units and the remaining units, other than the chain-stopping units, being dimethylsiloxane units. This material had a viscosity of about 600 centistokes at 25° C. Foamable compositions were prepared by mixing 100 parts of the methyl-beta-carboxyethylpolysiloxane described above, 8.66 parts of toluene diisocyanate (commercial grade) so as to provide one isocyanate radical per carboxyl group, and 0.1 part of an amine catalyst. The catalysts employed were tetramethylbutanediamine, n-ethylmorpholine, triethylamine, and tetramethylguanidine. In each case, the 0.1 of catalyst was added to 100 parts of the polysiloxane and 8.66 parts of the toluene diisocyanate, the mixture was rapidly stirred, and allowed to foam in an open cup. In each case, foaming began immediately and within about 30 minutes, a foam had been formed of a volume between four to five times the volume of the unfoamed starting mixture. As soon as the foaming was completed, the foam was examined and found to be a sticky, partially cured material. Each of the foam samples were then placed in a circulating air oven at a temperature of 100° C. and after 20 minutes, the foam had cured completely to produce a silicone elastomer foam which was highly elastic and which retained its flexibility at temperatures as low as about −40° C. to −50° C. which showed unlimited thermal stability at temperatures as high as 200° C.

EXAMPLE 2

In this example, the carboxyalkylpolysiloxane fluid was a trimethylsilyl chain-stopped copolymer of dimethylsiloxane units and methyl-beta-carboxyethylsiloxane units, contained an average of about 24 silicon atoms per molecule, about 20 percent of which were methyl-beta-carboxyethylsiloxane units, and had a viscosity at 25° C. of about 2,700 centistokes. Following the procedure of example 1, a number of foamable compositions were prepared, each containing 100 parts of the polysiloxane, 16.7 g. toluene diisocyanate (commercial grade), and 0.12 part of either N,N,N',N'-tetramethylbutanediamine, N-ethylmorpholine, triethylamine, or tetramethylguanidine. In each case, the composition began foaming as soon as the components were mixed and, in each case, the foamed product had a volume of about six to seven times the volume of the starting liquid material. As soon as the foaming had been completed, the foamed product was examined and was found to be less tacky than the product of example 1. Each of these foamed samples were cured in a circulating air oven at 100° C. for 20 minutes, to produce a cured product which was a rigid silicone foam.

EXAMPLE 3

The carboxypolysiloxane fluid employed in this example was a methyl-gamma-carboxypropylpolysiloxane fluid having a viscosity of about 140 centistokes at 25° and comprising in an average molecule one monomethylsiloxane unit, 20 dimethylsiloxane units, and three dimethyl-gamma-carboxypropylsiloxane units. One hundred parts of this fluid were mixed with 18.1 parts of commercial toluene diisocyanate and 0.12 parts of triethylamine and allowed to stand in an open vessel. After 30 minutes, the material in the vessel had foamed to a volume of about 3.5 times the volume of the starting material and after curing for 0.5 hour at 100° C. in a circulating air oven, this material was a flexible silicone rubber foam of greater flexibility than the foam of example 1.

EXAMPLE 4

The carboxyalkylpolysiloxane fluid in this example had a viscosity in excess of 5,000 centistokes at 25° C. and the average molecule contained 10 methylphenylsiloxane units, 10 methylethylsiloxane units, 10 dimethylsiloxane units, 3 delta-carboxybutylsiloxane units, and 5 trimethylsiloxane units. To 100 parts of this fluid was added 7.34 parts of hexamethylene diisocyanate and 0.10 part pyridine. This reaction mixture was stirred rapidly for a few seconds and then allowed to stand while it foamed to about triple its original volume in about 50 minutes. After this material had been cured in an oven at 100° C. for 2 hours, a cured, flexible silicone foam was obtained.

EXAMPLE 5

In this example, the carboxyalkylpolysiloxane fluid was a trimethylsilyl chain-stopped copolymer of dimethylsiloxane units and methyl-beta-carboxyethylsiloxane units in which the average molecule contained two trimethylsiloxane units, eight dimethylsiloxane units, and 10 methyl-beta-carboxyethylsiloxane units. It had a viscosity of about 3,500 centistokes at 25° C. When 100 parts of this silicone fluid was mixed with 112 parts toluene diisocyanate and 0.2 part of tetramethylguanidine, the resulting material foamed to a volume of about 10 times the original volume within about 15 minutes. When this material was cured, it was a highly cross-linked rigid silicone foam.

While the foregoing examples have illustrated many of the embodiments of my invention, it should be understood that my invention relates broadly to a process for the preparation of organopolysiloxane foams which can vary from flexible elastic foams to rigid, highly cross-linked foams, depending upon the nature of the organopolysiloxanes and the diisocyanates employed. This invention also relates to the useful foams formed by such process. These foams are useful in applications where the combination of relatively low density, with or without flexibility, is required over a wide temperature range. For example, the flexible foams within the scope of this invention are useful in shock mount applications for apparatus which is to be subjected to extremes of temperature. Likewise, the rigid foams can be used in applications where the insulating qualities of a film are needed over a wide temperature range or over a wide temperature differential.

What I claim as new and desire to secure by letters Pat. of the U.S. is:

1. A method of forming an organopolysiloxane foam which comprises mixing (A) a carboxyalkylpolysiloxane having the formula:

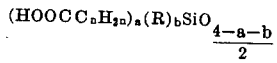

(B) a diisocyanate having the formula:

wherein there is about a stoichiometric ratio of one isocyanate group per carboxyl group, and (C) from 0.05 to 5 percent by weight based on the weight of the reaction mixture of a tertiary amine, allowing the mixture to foam and curing the foam, where R is a monovalent hydrocarbon radical; R' is a divalent hydrocarbon radical free of aliphatic unsaturation and containing at least three carbon atoms; $a$ has a value of from 0.01 to 0.5, inclusive, $b$ has a value of from 1.48 to 2.00, inclusive, and the sum of $a$ plus $b$ is from 1.98 to 2.01, inclusive; and $n$ has a value of from 2 to 4, inclusive.

2. The method of claim 1 in which R is methyl.

3. The method of claim 1 in which the diisocyanate is toluene diisocyanate.

4. The method of claim 1 in which $n$ has a value of two.

5. The method of claim 1 in which R is methyl, the diisocyanate is toluene diisocyanate, and $n$ is 2.

6. The method of claim 5 in which the tertiary amine is composed only of carbon, hydrogen, and nitrogen.

7. The method of claim 1 in which the diisocyanate is present in an amount sufficient to provide about one isocyanate group per carboxyalkyl group in said carboxyalkylpolysiloxane and in which said tertiary amine is present in a catalytic amount.

* * * * *